United States Patent
Baloga et al.

(10) Patent No.: US 6,623,075 B2
(45) Date of Patent: Sep. 23, 2003

(54) CHILD SAFETY SEAT

(75) Inventors: Thomas Charles Baloga, Fort Mill, SC (US); Gang Liu, Rock Hill, SC (US)

(73) Assignee: Britax Child Safety Inc., Charlotte, NC (US)

(*) Notice: Subject to any disclaimer, the term of this patent is extended or adjusted under 35 U.S.C. 154(b) by 0 days.

(21) Appl. No.: 10/091,243

(22) Filed: Mar. 5, 2002

(65) Prior Publication Data

US 2002/0149242 A1 Oct. 17, 2002

Related U.S. Application Data

(60) Provisional application No. 60/273,526, filed on Mar. 5, 2001.

(51) Int. Cl.$^7$ .................................................. B62J 1/00
(52) U.S. Cl. .............................. 297/250.1; 297/216.12
(58) Field of Search .......................... 297/250.1, 184.1, 297/184.13, 184.15, 464, 216.1, 216.11, 216.12, 487, 488, 184.16, 184.17; 135/90, 95, 96, 97

(56) References Cited

U.S. PATENT DOCUMENTS

| | | | | |
|---|---|---|---|---|
| 3,258,291 A | * | 6/1966 | Ezquerra | |
| 3,836,168 A | * | 9/1974 | Nonaka et al | |
| 3,922,034 A | * | 11/1975 | Eggert | |
| 4,112,957 A | * | 9/1978 | Biven | |
| 4,293,162 A | * | 10/1981 | Pap et al. | |
| 4,579,385 A | * | 4/1986 | Koenig | |
| 4,693,512 A | * | 9/1987 | Hobson | |
| 4,790,593 A | * | 12/1988 | Davalos et al. | |
| 4,790,601 A | | 12/1988 | Burleigh et al. | |
| 5,083,837 A | * | 1/1992 | Roach | |
| 5,205,308 A | * | 4/1993 | Kendall et al. | |
| 5,624,152 A | * | 4/1997 | Yoshie et al. | |
| 5,645,311 A | * | 7/1997 | Emmer et al. | |
| 5,653,248 A | * | 8/1997 | Ness | |
| 5,662,379 A | * | 9/1997 | Zimelman | |
| 5,716,095 A | * | 2/1998 | Lopez | |
| 5,895,092 A | * | 4/1999 | Fischer | |
| 6,045,183 A | * | 4/2000 | Weber | |
| 6,193,311 B1 | * | 2/2001 | Payton | |
| 6,296,305 B1 | * | 10/2001 | Lamka et al. | |

FOREIGN PATENT DOCUMENTS

| | | |
|---|---|---|
| DE | 29817366 U1 | 9/1998 |
| DE | 19918517 C1 | 4/1999 |
| WO | 91/19623 | 12/1991 |

* cited by examiner

*Primary Examiner*—Milton Nelson, Jr.
(74) *Attorney, Agent, or Firm*—Davis & Bujold, P.L.L.C.

(57) ABSTRACT

A child safety seat comprises a seat body having a seat portion and a backrest portion. A head restraint has a support portion secured to the backrest so as to project beyond the upper end thereof and a restraint portion immovably secured to the upper end of the support portion so as to project therefrom in a direction that remains generally parallel to the seat portion.

7 Claims, 3 Drawing Sheets

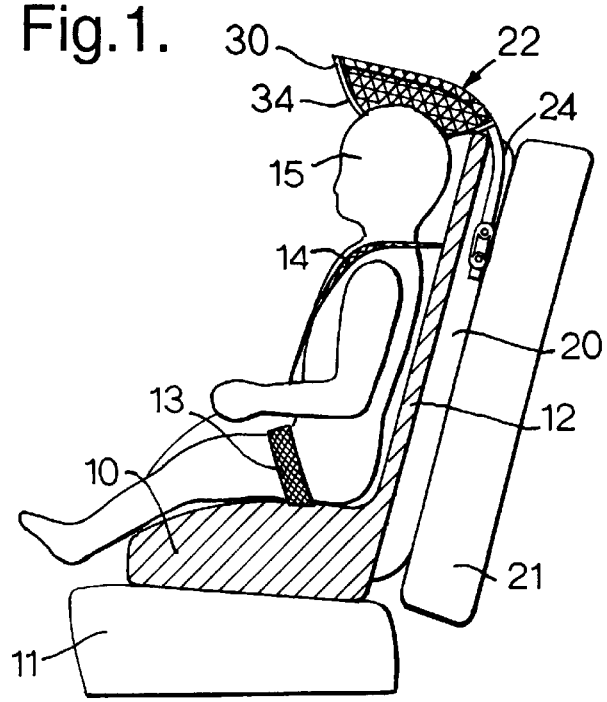
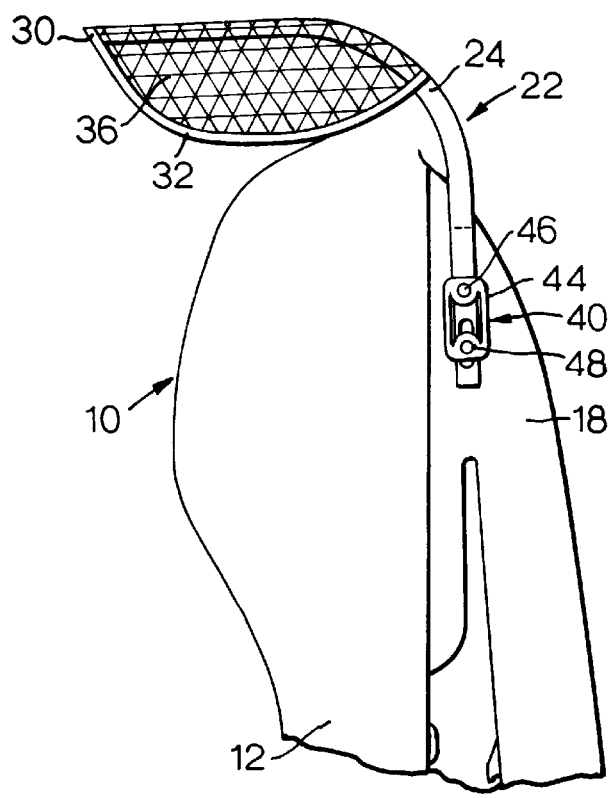

CHILD SAFETY SEAT

This application claims benefit of Provisional No. 60/273,526 filed Mar. 5, 2001.

FIELD

This invention relates to a child safety seat having means for protecting the head of a child seated therein.

During a vehicle crash, a child seated in a safety seat can be subject to forces from any direction. For example, in a rear impact, a forward-facing child will experience forces tending to move the child up the back of the child seat. Similar forces are experienced by a child in a rear-facing seat during a frontal impact. In both cases, such movement is restricted by the shoulder straps of the child seat harness but the head can still be subject to high G forces, placing high neck extension loads on the child.

SUMMARY OF THE INVENTION

According to the invention, a child safety seat comprises a seat body having a seat portion and a backrest portion, and a head restraint having a support portion secured to the backrest so as to project beyond the upper end thereof and a restraint portion immovably secured to the upper end of the support portion so as to project therefrom in a direction that remains generally parallel to the seat portion.

BRIEF DESCRIPTION OF THE DRAWINGS

An embodiment of the invention will now be described, by way of example, with reference to the accompanying drawings, in which:

FIG. 1 is a transverse cross-sectional view of a child safety seat having a head restraint device in accordance with the invention;

FIG. 2 is a side view of the upper part of FIG. 1 on an enlarged scale;

DETAILED DESCRIPTION OF THE PREFERRED EMBODIMENT

Figure 3:
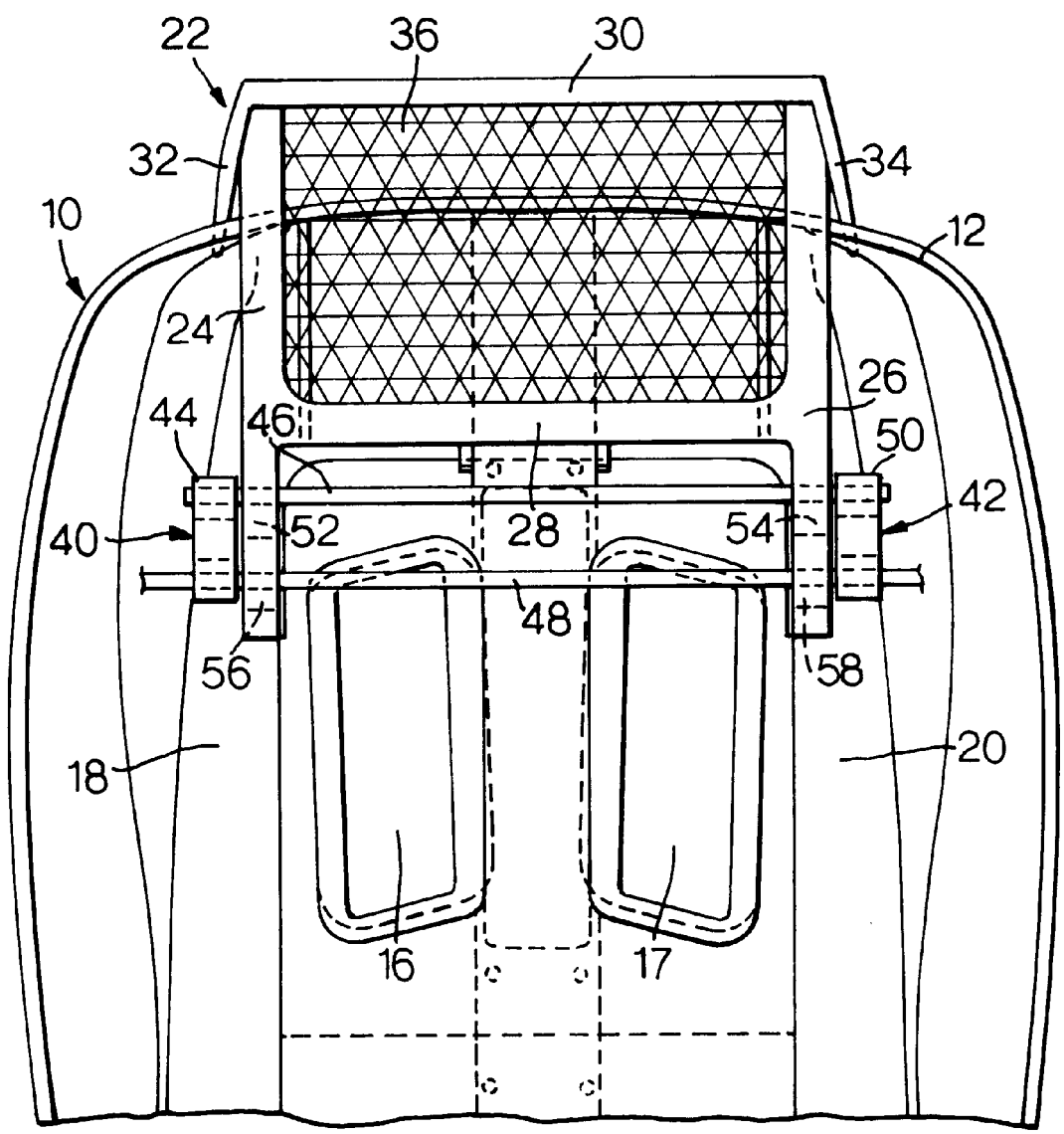
FIG. 3 is a rear elevation of the upper part of the child safety seat shown in FIG. 1.

Referring to FIGS. 1 to 3, a child safety seat 10 in accordance with the invention, is secured on a vehicle seat 11. The child seat 10 has a backrest 12 and a harness (not shown in FIGS. 2 and 3) having a pair of lap straps 13 and a pair of shoulder straps 14 for restraining a child 15 in the seat 10. Each shoulder strap 14 extends through a respective slots 16, 17 (FIG. 3) in the backrest 12. The slots 16 and 17 form part of a height adjustment mechanism for the shoulder straps 14 as described in U.S. Pat. No. 4,790,601 which is incorporated herein by reference. The backrest 12 has a pair of integrally moulded vertically extending beams 18 and 20 projecting rearwardly into abutment with the backrest 21 of the vehicle seat 11.

A head restraint 22 has an H-shaped frame comprising side limbs 24 and 26 and a transverse member 28. The lower ends of the side limbs 24 and 26 are secured to the beams 18 and 20 respectively. Above the transverse member 28, the side limbs 24 and 26 are bent through 90° so that their outer ends project in a direction generally perpendicular to the seat back 12.

A U-shaped member has a central portion 30 extending between the outer ends of the side limbs 24 and 26 and side portions 32 and 34, which curve downwardly and rearwardly to the right angle bend in the side limbs 24 and 26 respectively, so as to form side wings for the head restraint. A piece of net-like sheet material 36 is attached, on three sides, to the U-shaped member 30, 32, 34. The fourth side of the sheet material 36 is secured to the transverse member 28 of the H-shaped frame.

The H-shaped frame may be rigidly coupled to the beams 18 and 20. Preferably, it is coupled thereto by respective energy-absorbing couplings 40 and 42. As can best be seen in FIG. 2, the energy-absorbing coupling 40 comprises a plate 44 of elastic material and having upper and lower rods 46 and 48 rigidly secured thereto. The energy-absorbing coupling 42 for the limb 26 consists of a similar elastic plate 50 on the other end of the rods 46 and 48. The upper rod 46 is secured rigidly to the limbs 24 and 26 of the H-shaped frame but received in vertically extending guide slots 52 and 54 in the beams 18 and 20. Similarly, the rod 48 is secured rigidly to the beams 18 and 20 but received in guide slots 56 and 58 in the limbs 24 and 26. Consequently, when enough force is applied to the head restraint 22, tending to displace it away from the seat body 10, the energy absorbing elements 40 and 42 are stretched. Alternatively, the couplings may be frangible foam or honeycomb "tuned" to the age/weight of the child.

In the event of an accident tending to displace a child upwardly relative to the seat body 10, the head restraint 22 limits head excursion out of the bounds of the seat body 10.

Figure 4:
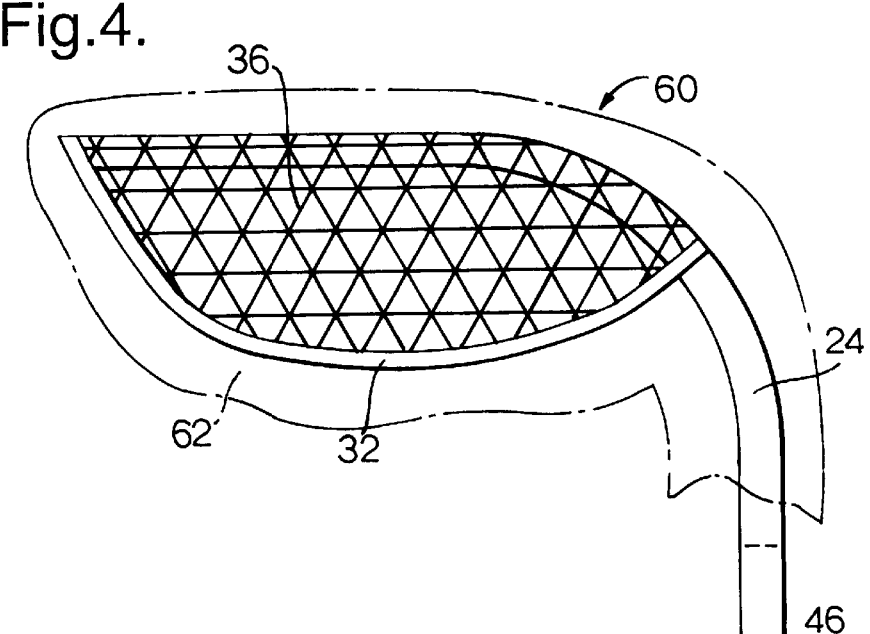
FIG. 4 is a side view of an alternative head restraint in accordance with the invention.
Figure 5:
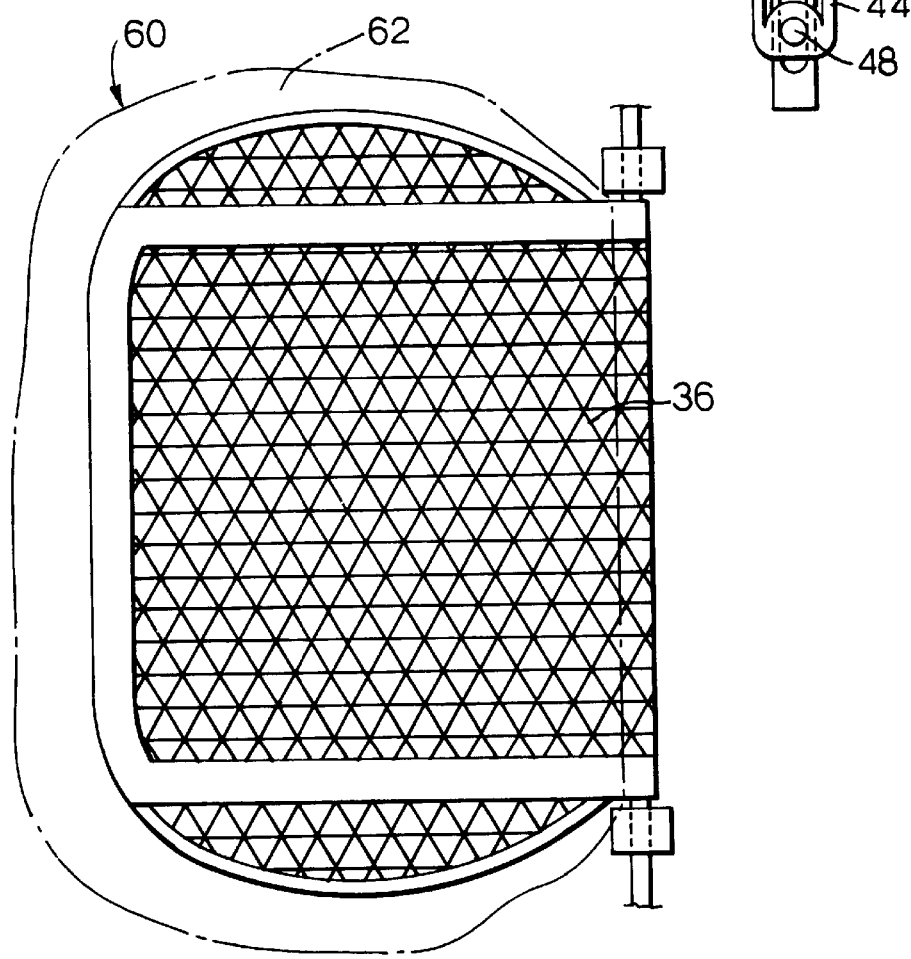
FIG. 5 is a plan view of the head restraint shown in FIG. 4.

FIGS. 4 and 5 illustrate an alternative head restraint 60 which differs from the head restraint 22 of FIGS. 1 and 2 only in that the mesh layer 36 and the various rigid members 24, 26, 32 and 34 are enclosed in a foam-padded cover 62.

What is claimed is:

1. A child safety scat comprising:

a seat body having a seat portion and a backrest portion; and a head restraint having a supped portion immovably secured to the backrest portion so as to project beyond the upper end thereof and a restraint portion immovably secured to the upper end of the support portion so as to project therefrom in a direction that remains generally parallel to the seat portion, the restraint portion comprising sheet material secured to a peripheral frame.

2. The child safety seat according to claim 1, wherein the restraint portion is enclosed in a resiliently padded cover.

3. A child safety seat comprising:

a seat body having a seat portion and a backrest portion, a head restraint having a support portion projecting beyond the upper end of the backrest portion and a restraint portion immovably secured to the upper end of the support portion so as to project therefrom in a direction that remains generally parallel to the seat portion; and energy-absorbing coupling means connecting the support portion to the backrest so as to allow limited relative movement in a direction perpendicular to the seat portion and to prevent relative movement in directions parallel to the seat portion.

4. The child safety seat according to claim 3, wherein the restraint portion comprises sheet material secured to a peripheral frame.

5. The child safety seat according to claim 3, wherein the restraint portion is enclosed in a resiliently padded cover.

6. A child safety seat comprising:

a seat body having a seat portion and a backrest portion; and a head restraint having a support portion immovably secured to the backrest portion so as to project beyond the upper end thereof and a restraint portion immovably secured to the upper end of the support portion so as to project therefrom in a direction that remains generally parallel to the seat portion, so as to overlie an area of the seat portion contiguous with the backrest portion; and the restraint portion comprises sheet material secured to a peripheral frame.

7. The child safety seat according to claim 6, wherein the restrain portion is enclosed in a resiliently padded cover.

* * * * *